United States Patent
Tsychida et al.

[11] 3,909,295
[45] Sept. 30, 1975

[54] ALKALINE CELL
[75] Inventors: Takashi Tsychida, Kosai; Kenichi Shinoda, Toyohashi; Teruyoshi Yasuda; Takaoki Takeshima, both of Kosai, all of Japan
[73] Assignee: Fuji Electrochemical Co., Ltd., Tokyo, Japan
[22] Filed: May 17, 1974
[21] Appl. No.: 471,165

[52] U.S. Cl. .............................. 136/83 R; 136/163
[51] Int. Cl. ........................................... H01m 1/00
[58] Field of Search............ 136/163, 107, 168–169, 136/133, 83

[56] References Cited
UNITED STATES PATENTS
2,605,299  7/1952  Teas................................ 136/169 X
3,617,386  11/1971  Bosben et al. ...................... 136/107

Primary Examiner—Anthony Skapars
Attorney, Agent, or Firm—Fleit & Jacobson

[57] ABSTRACT

In an alkaline cell, an acid layer is provided to an inner surface of an anode terminal member where an alkaline electrolyte creeps by electrocapillary action. An acid in the acid layer reacts with the alkaline electrolyte to produce a salt.

5 Claims, 1 Drawing Figure

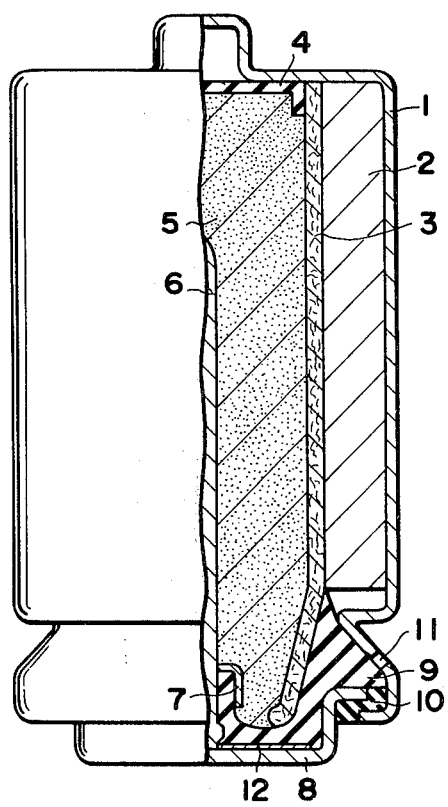

ALKALINE CELL

The present invention relates to an alkaline cell and more particularly to an improvement of a leak-proof structure of an alkaline cell.

It has been known that an alkaline electrolyte in an alkaline cell has an inclination to creep along a metal surface through even a small gap or space due to an electro capillary action and that the creeping thereof increases as temperature and humidity goes higher. As is well known, electrocapillary action is the result of electrolyte wetting the seal used to separate the oppositely charged parts of the cell container; i.e., the positive container cover and the negative container or vice versa, and thereby providing a path across which an electric current will flow. This current produces what is termed "electrocapillary drive" which encourages creepage and actually drives electrolyte from the cell no matter how good the mechanical seal. Such electrocapillary action is referred to in U.S. Pat. No. 3,068,312, issued to John L. S. Daley et al. on Dec. 11, 1962.

If the alkaline electrolyte leaks out of the cell, it absorbs carbon dioxide in the air to form crystals of alkaline carbonate, which often overspreads the outside of an anode terminal plate made of metal. This results in a poor electrical connection between the cell and an electrical appliance. Further, the leaked alkaline electrolyte may not only pollute terminals of the appliances but also creep further into inner electric circuits of the appliances, resulting in a definite problem of degradation of the electric circuits.

In order to eliminate or reduce the leakage of the alkaline electrolyte outside of the cell, there have been tried many physical approaches such as to minimize the metal surface on the electrolyte creeping way, to use a special sealing material, to vary a clamping manner of the terminal plate against the sealing member, or to use bonding agents or repellent material. These physical approaches can lower the speed, and lessen the amount, of the alkaline electrolyte creeping, and may effectively prevent the electrolyte from leaking out through a cathode side. However, the electrolyte creeping on the side of the anode is more vigorous than the cathode side due to the electrocapillary action and cannot be checked completely by the known method and assembly.

Accordingly, an object of the present invention is to provide an alkaline cell which can easily and completely prevent an alkaline electrolyte from creeping out of the cell.

According to the present invention, there is provided an alkaline cell comprising an anode active mass, a cathode active mass, and anode terminal member electrically connected to said anode active mass, a cathode terminal member electrically connected to said cathode active mass, and an insulator disposed between said terminal members, wherein an acid layer is provided on an inner surface of said anode terminal member where an alkaline electrolyte creeps by electrocapillary action, said acid layer containing acid reactive to said alkaline electrolyte to produce a salt.

Other objects, features and advantages of the present invention will become apparent from the following description of a preferred embodiment thereof when taken in conjunction with the accompanying single drawing, which is a partly sectioned view of an alkaline cell showing an embodiment of the present invention.

In the drawing, a cathode metal casing 1 of the cell is coated with nickel and contains therein an annular shaped cathode active mass 2 which consists of a mixture of manganese dioxide $MnO_2$ with phosphorous graphite and binders such as carboxymethylcellulose, polyvinyl alcohol, polyisobutylene, or the like. The cathode active mass 2 is separated from an anode active mass 5 by a separator 3 made of non-woven fabric of polypropylene and the like. At one end of the separator 3, which is an upper end in the drawing, adhered is an insulating disc 4 of nylon, polypropylene, on polyethylene. The anode active mass 5 inside of the separator 3 and the insulating disc 4 is made of a mixture of zinc oxide, water, carboxymethylcellulose, potassium hydroxide and amalgamated zinc powder containing 3–4% of mercury. A current collector 6 made of brass and the like extends into the anode active mass 5 along the axis thereof and is spot-welded to an anode terminal plate 8 at the center portion thereof. The cathode casing 1 and the anode terminal plate 8 are electrically separated by two sealing insulators 9, 10. The first sealing insulator 9 is made of nylon, polypropylene or the like and disposed inside of the anode terminal plate 8 and extends radially inwardly from the marginal portions between the anode terminal plate 8 and the cathode casing 1 to the circumferential portion of the current collector 6. The second sealing insulator 10 is made of rubber or the like having elasticity higher than the first sealing insulator and is constricted between free ends of the cathode casing 1 and the anode terminal plate 8. The first sealing insulator 9 has an annular wall portion at the center portion thereof through which the current collector 6 penetrates and which is constricted against the current collector by an annular cap member 7. The cathode metal casing 1 has at least a gas venting aperture 11 at an end portion to which the first sealing insulator 9 abuts. The venting aperture 11 allows the gas developed in the cell to a predetermined high pressure to escape therethrough to the outside of the cell.

Provided between the first sealing insulator 9 and the anode terminal plate 8 adjacent the current collector 6 is a thin acid layer 12, the acid of which reacts with the alkaline electrolyte to form salt. Accordingly, the alkaline electrolyte creeping, due to the electrocapillary action, thorugh an interspace between the current collector 6 and the annular wall portion of the first sealing insulator 9 is changed into salt as it comes to the inner surface of the anode terminal plate 8 where the acid layer 12 is provided. Thus, the leakage of the alkaline electrolyte outside of the cell is completely interrupted.

The acid layer 12 of the present invention is preferably provided in combination with known sealing structure of cells in which the creeping way of the alkaline electrolyte is elongated. The provision of the present acid layer 12 shows remarkable advantages in small-sized cells in which a long creeping way cannot be formed such as mercury cell, silver oxide cell, an alkaline-manganese cell.

The acid employed in the present invention includes organic and inorganic acids which actively neutralize the alkaline electrolyte and produce salts. The organic acids are acidic organic compounds. Though the acidic organic compounds contain those soluble or insoluble in water, they react easily with the alkaline electrolyte such as sodium hydroxide or potassium hydroxide and produce soluble salts. As the organic acids, there are the organic compounds of the following functional groups:

| | | |
|---|---|---|
| Carboxylic Acid | : | RCOOH |
| Sulfonic Acid | : | $RSO_3H$ |
| Sulfinic Acid | : | $RSO_2H$ |
| Phenol | : | ArOH |
| Enol | : | $RCH = C(OH)R'$ |
| Thiophenol | : | ArSH |
| Imido | : | RCONHCOR |
| Oxime | : | $RCH = NOH$ |
| Aromatic Sulfonamide Primary and Secondary | : | $ArSO_2NH_2$, $ArSO_2NHR$ |
| Nitro Compounds | : | $RCH_2NO_2$, $RcCHNO_2$ |

In the organic acids set forth above, carboxylic acid, sulfonic acid and sulfinic acid are relatively strong acids, and especially the sulfonic acid is very strong like sulfuric acid.

The organic acids set forth above are effective to prevent the creeping of the alkaline electrolyte since they produce salts by reacting with the alkaline electrolyte. However, it is preferable to use weak acid for safety of handling.

The organic acid is preferably mixed with bonding agent or viscous material and attached or coated to the inner surface of the anode terminal plate 8 to form a thin layer 12. At this time, in order not to corrode the metal surface of the anode terminal plate 8 by the organic acid, the layer 12 of the organic acid is made free from water as much as possible.

As the inorganic acid to be used to react with the alkaline electrolyte to produce salts, a boric acid is preferable for handling.

The inventors examined the alkaline electrolyte leakage with respect to 180 "AA" size alkaline-manganese cells constructed according to the embodiment shown in the drawing of the present invention, and found no leakage on the surfaces of the cells, whereas same type of cells using a bonding agent or vaseline alone experienced the leakage with respect to more than 50% cells out of the all cells examined.

The experiment shows as follows:

| Example: | composition of acid layer | cells with leakage /cells examined |
|---|---|---|
| 1. | oxalate + vaseline (1:1) | 0/20 |
| 2. | phthalic acid + vaseline (1:1) | 0/20 |
| 3. | citric acid + vaseline (1:1) | 0/20 |
| 4. | tartaric acid + vaseline (1:1) | 0/20 |
| 5. | stearic acid + vaseline (1:1) | 0/20 |
| 6. | salicylic acid + vaseline (1:1) | 0/20 |
| 7. | maleic acid + vaseline (1:1) | 0/20 |
| 8. | succinic acid + vaseline (1:1) | 0/20 |
| 9. | boric acid + vaseline (1:1) | 0/20 |
| 10. | vaseline (conventional type) | 10/20 |
| 11. | epoxy resin (conventional type) | 12/20 |

In the above experiments, all of the cells were shelved in an atmosphere at a temperature of 55°C and humidity of 95% for 1 year.

As is apparent from the above experiments, Examples 1 through 8 using the organic acids and Example 9 using inorganic acid in the acid layer showed no leakage at all after one year shelving under such severe conditions. It was found that the alkaline electrolyte in the cells of Examples 1–9 was completely prevented from creeping at the inner surface of the anode terminal plate where the acid layer is provided. On the other hand, it was found that even in the cells which appeared no leakage in the Examples 10 and 11, the alkaline electrolyte crept up to the inner circumferential portion of the anode terminal plate and that it is a matter of time that the alkaline electrolyte creeps out of the cells.

Although the acid layer 12 in the Examples of the present invention was formed by mixing the acid with vaseline, other semiflowage or viscous materials such as grease, paraffin, wax or epoxy resin may be used.

What is claimed is:

1. An alkaline cell comprising an anode active mass, a cathode active mass, an anode terminal member electrically connected to said anode active mass, a cathode terminal member electrically connected to said cathode active mass, and an insulator disposed between said terminal members and an acid layer on the inner surface of said anode terminal member within the path of an alkaline electrolyte which creeps by electrocapillary action, said acid layer containing acid reactive to said alkaline electrolyte to produce a salt.

2. An alkaline cell as claimed in claim 1, wherein the acid in said acid layer is a weak acid.

3. An alkaline cell as claimed in claim 1, wherein said acid layer contains a viscous material mixed with said acid, said acid layer being attached to said inner surface of said anode terminal member.

4. An alkaline cell as claimed in claim 1, including a current collector extending into said anode active mass and wherein said insulator is disposed between adjacent marginal portions of said cathode and anode terminal members in tight fitting engagement with the inner surface of said anode terminal member and with said current collector extending centrally through said insulator, said acid layer being disposed between said insulator and said anode terminal member adjacent said current collector.

5. An alkaline cell as claimed in claim 3, wherein said viscous material is a vaseline.

* * * * *